United States Patent [19]
Kwon

[11] Patent Number: 5,953,932
[45] Date of Patent: Sep. 21, 1999

[54] REFRIGERATOR EQUIPPED WITH A COMPRESSOR FIXTURE STRUCTURE

[75] Inventor: Hyuk-Jang Kwon, Incheon, Rep. of Korea

[73] Assignee: Daewoo Electronics Co., Ltd., Seoul, Rep. of Korea

[21] Appl. No.: 08/986,872

[22] Filed: Dec. 8, 1997

[30] Foreign Application Priority Data

Feb. 20, 1997 [KR] Rep. of Korea .......................... 97-2620

[51] Int. Cl.⁶ .................................................. F25D 19/00
[52] U.S. Cl. ................................ 62/297; 248/676; 310/91
[58] Field of Search ..................... 62/296, 297; 248/676; 310/91

[56] References Cited

U.S. PATENT DOCUMENTS

| | | | |
|---|---|---|---|
| 2,256,937 | 9/1941 | Beams et al. | 310/91 |
| 2,552,572 | 5/1951 | Mikina | 310/91 |
| 3,187,995 | 6/1965 | Kjeldsen | 62/296 |
| 3,465,182 | 9/1969 | Church et al. | 310/91 |
| 3,785,167 | 1/1974 | Sahs | 62/296 |
| 4,885,492 | 12/1989 | Van Sickle | 310/91 |

FOREIGN PATENT DOCUMENTS 109813  2/1944  Sweden ................................. 248/676

*Primary Examiner*—William E. Tapolcai
*Attorney, Agent, or Firm*—Jacobson, Price, Holman & Stern, PLLC

[57] ABSTRACT

A compressor fixture structure for a refrigerator has a fixture plate, bolts, elastic members, compressor supports, and clamping members. The fixture plate is fixedly mounted on the bottom of the machine room of a refrigerator and has an first opening in the center of the upper side thereof for the compressor to be inserted thereinto. The bolts are fixedly mounted around the first opening of the upper side. The elastic members are inserted over the bolts. The compressor supports have a second opening, one sides of the compressor supports are fixed along the weight center line of the body of the compressor, and the other sides of compressor supports have the second openings for the compressor supports to be inserted over the bolts over the elastic members, wherein each of the plurality of compressor supports has one second opening. The clamping members clamp the compressor supports while fixed to the bolts, respectively.

4 Claims, 3 Drawing Sheets

1

REFRIGERATOR EQUIPPED WITH A COMPRESSOR FIXTURE STRUCTURE

BACKGROUND OF THE INVENTION

1. Field of the Invention

The present invention relates to a refrigerator, and more particularly to a refrigerator equipped with a compressor fixture structure for reducing transfer of the compressor vibration to the refrigerator cabinet.

2. Prior Art

In general, as shown in FIG. 1, a machine room 20 is formed in the lower rear portion of a refrigerator. The machine room 20 accommodates a compressor 10, a wire condenser 11, a cooling fan 12 and so on therein. The compressor 10 in the machine room 20 generates lots of vibration and noise when compressing refrigerant with high pressure. To reduce the vibration and noise of the compressor 10, there is provided 4 compressor supports 5 to support the lower portion of the compressor 10. Each of the compressor supports 5 has an opening. Each of the compressor supports 5 is inserted over a bolt 14 through an opening thereof. Each of two compressor supports 5 is supported by a spring 2 inserted over the bolt 14 which is welded into the bottom of the machine room 20. Each of the other two compressor supports 5 is supported by an elastic buffer rubber 3 inserted over another bolt 14. A nut or a washer is mounted on each of the compressor supports 5 not to be off the bolt 14. Accordingly, the compressor 10 can move up and down. Thus, the elastic buffer rubber 3 or the spring 2 absorbs the vibration of the compressor 10 to prevent the vibration from transferring to the refrigerator cabinet through refrigerant pipe or the bottom of the machine room 20. However, in the conventional compressor fixture structure, the center of weight is not taken into consideration. A reference numeral C denotes a weight center line of the compressor 10. The lower portion under the weight center line C of the compressor 10 is fixed to the compressor supports 5. Therefore, the fixture position of the compressor 10 by the compressor supports 5 is away from the weight center line C, so that the compressor 10 severely vibrates up and down during its operation. Accordingly, drawback exists in that much vibration tends to be transferred to the refrigerator cabinet.

SUMMARY OF THE INVENTION

In order to overcome the above drawback, it is an object of the present invention to provide a refrigerator equipped with a compressor fixture structure capable of decreasing vibration transfer from a compressor to the refrigerator cabinet.

To achieve the above object, in mounting a compressor in a machine room of a refrigerator, the compressor fixture structure according to the present invention has compressor supports fixed to the body of the compressor along the weight center line of the compressor. Each of the compressor supports has a first opening. A fixture plate of an open box shape is welded into the bottom of the machine room, and has an second opening in the upper side thereof for the compressor to be inserted thereinto. Bolts are mounted around the second opening in a certain distance therebetween. Springs and elastic buffer rubbers are inserted over the bolts and then the compressor supports are inserted on the springs and the elastic buffer rubbers over the bolts through the first openings.

Since the compressor is supported on the weight center line thereof, transferring vibration and noise to the refrigerator cabinet become less.

BRIEF DESCRIPTION OF THE DRAWINGS

These and other objects and features of the present invention can be understood through the following embodiment by reference to the accompanying drawings, in which.

DETAILED DESCRIPTION OF THE PREFERRED EMBODIMENT

Figure 1:
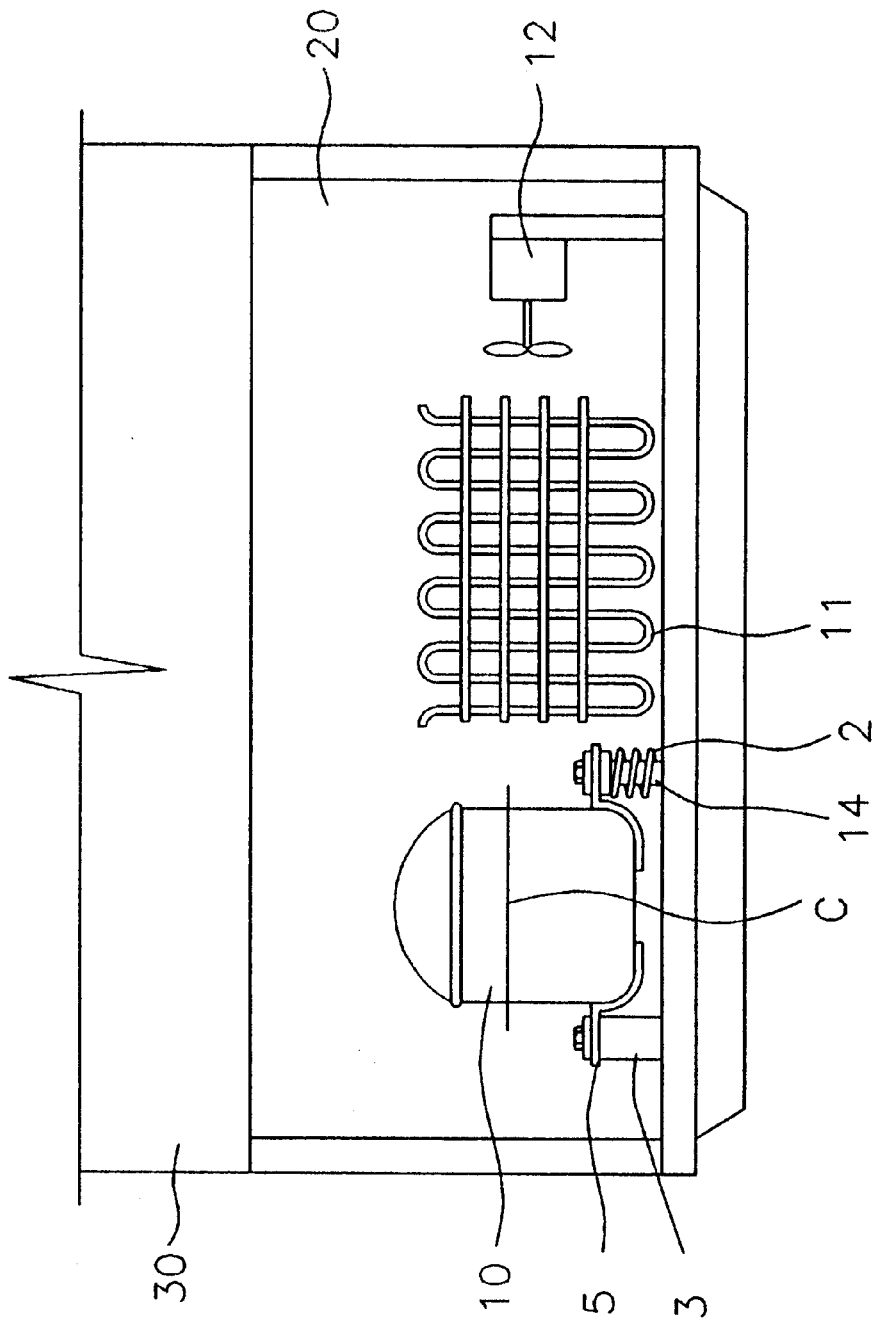
FIG. 1 is a view for schematically showing a conventional compressor fixture structure for a refrigerator which is mounted in the lower rear portion of the refrigerator.

Description of the compressor fixture structure for a refrigerator will be made in detail hereinafter with reference to the accompanying drawings. The same reference numerals will be used for the same elements as above.

Figure 2:
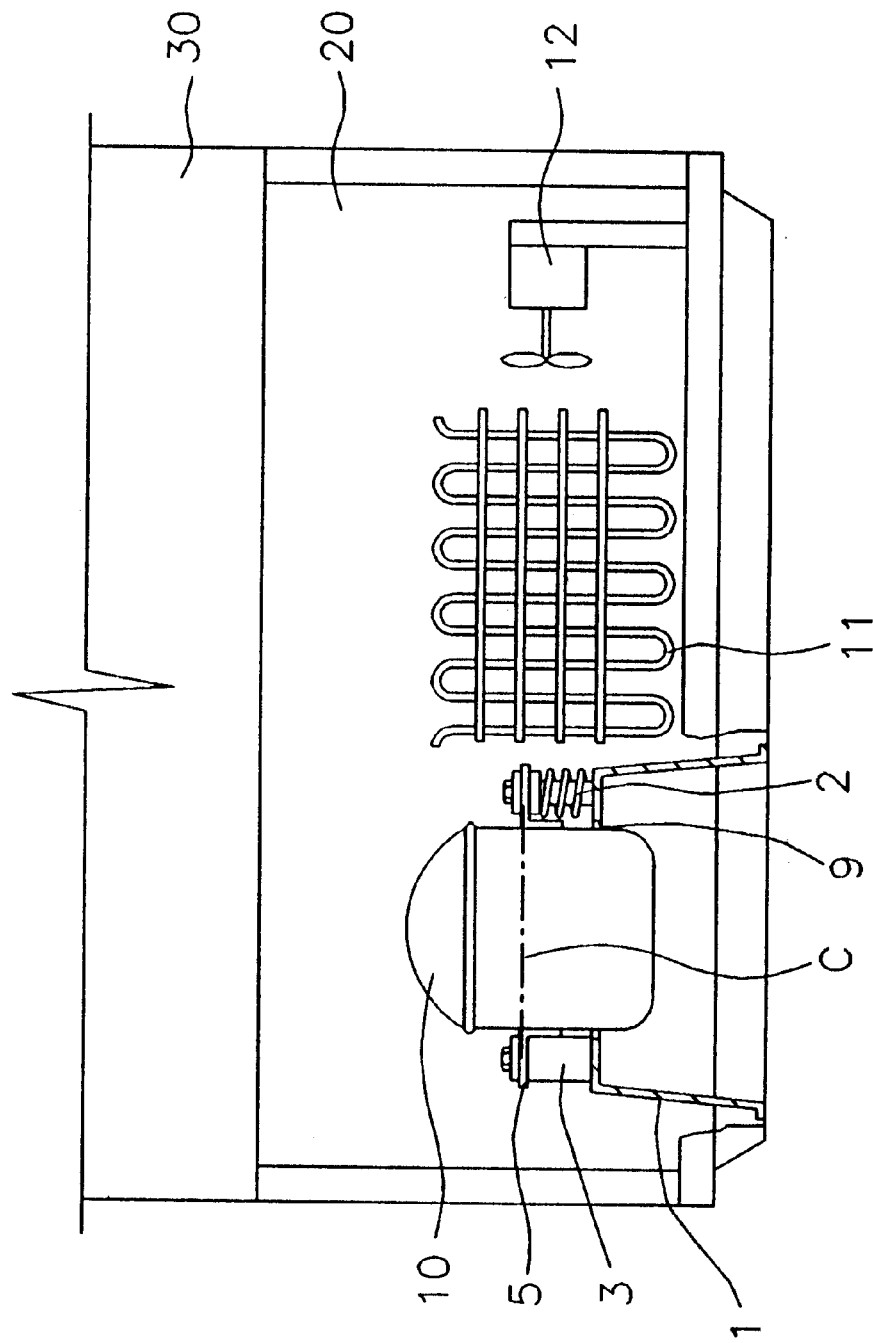
FIG. 2 is a view for schematically showing a compressor fixture structure for a refrigerator according to an embodiment of the present invention.
Figure 3:
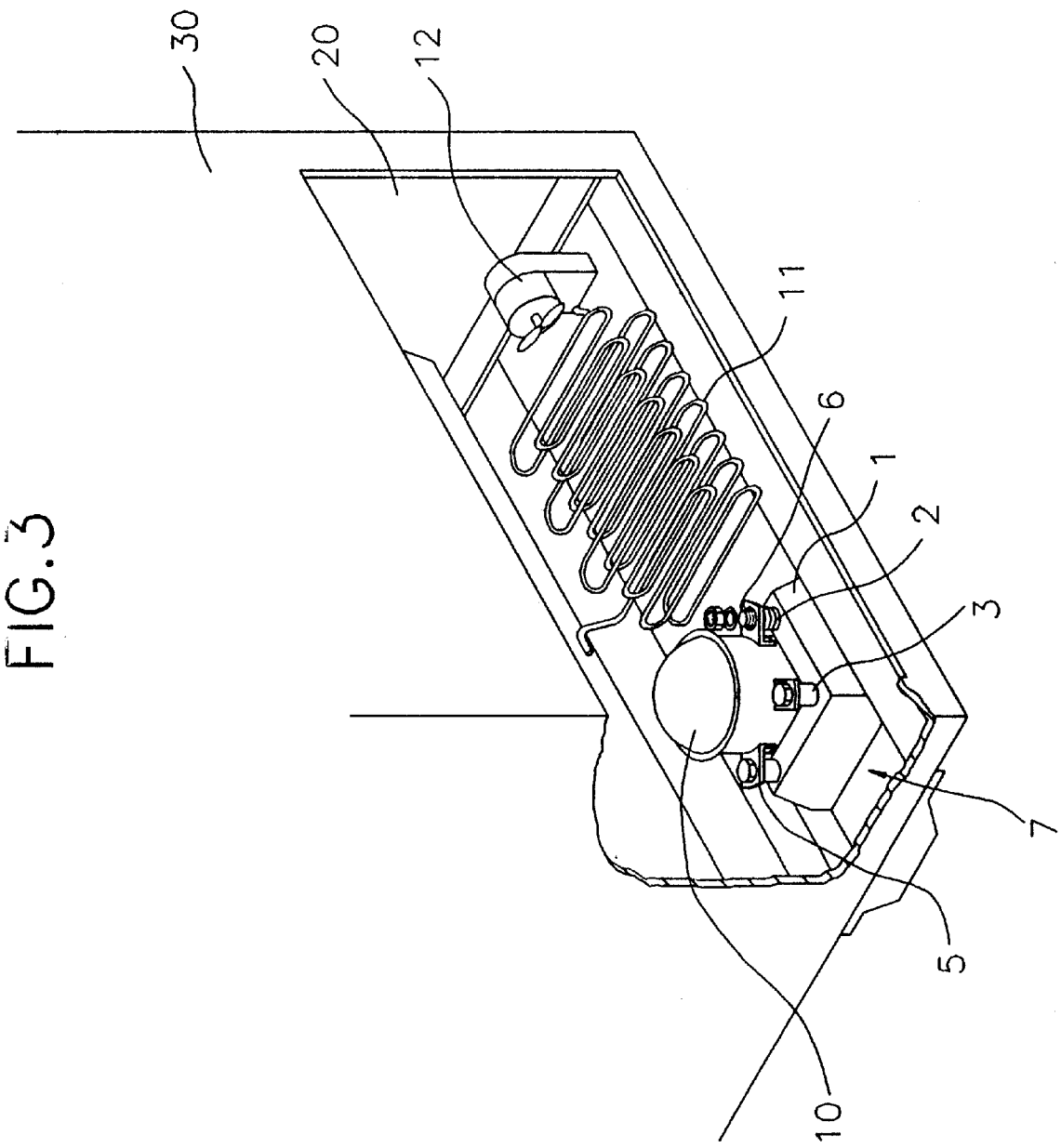
FIG. 3 is a perspective view for showing the compressor fixture structure of FIG. 2.

FIG. 2 is a view for schematically showing a compressor fixture structure for a refrigerator according to an embodiment of the present invention, and FIG. 3 is a perspective view for showing the compressor fixture structure of FIG. 2. As shown in FIGS. 2 and 3, the compressor fixture structure 7 is mounted in a machine room 20 which is formed in the lower rear portion of a refrigerator 30. The compressor fixture structure 7 includes a fixture plate 1 having a second opening 9 in the center portion of the upper side thereof. The fixture plate 1 is of a box shape with an open side. The upper side is one that is opposite to the open side. The edges of the open side are fixed to the bottom of the machine room 20. Four bolts 3 are fixed to the upper side around the second opening 9 in a certain distance therebetween.

Further, the compressor 10 is inserted in the second opening 9 and supported by four compressor supports 5 which are fixedly welded into the body of the compressor 10 along the weight center line C in a certain distance therebetween. Each of two compressor supports 5 is supported by an elastic buffer rubber 3 inserted over a bolt 4, and each of the other two compressor supports 5 is supported by a spring 2 inserted over a bolt 4. The compressor supports 5 are fixed not to be off the bolt 4. Each of the compressor supports 5 has a first opening 6, so that the compressor supports 5 are inserted into the bolts 4 through the first openings 6, respectively.

That is, in the compressor fixture structure 7 for a refrigerator according to an embodiment of the present invention, the compressor supports 5 are welded into the body of the compressor 10 along the weight center line of the compressor 10 in a certain distance therebetween, so that the compressor 10 can be elastically supported by the compressor supports 5.

Accordingly, since the compressor 10 is supported on the weight center line by the compressor supports 5, transferring vibration to the compressor supports 5 becomes small, to thereby decrease vibration and noise of the refrigerator.

It is understood that various other modifications will be apparent to and can be readily made by those skilled in the art without departing from the scope and spirit of this invention.

Accordingly, it is not intended that the scope of the claims appended thereto be limited to the descriptions set forth herein, but rather that the claims be constructed as encompassing all the features of the patentable novelty that reside in the present invention, including all the features that would be treated as equivalent thereof by those skilled in the art to which this pertains.

What is claimed is:

1. A refrigerator including a compressor and a compressor fixture structure, the compressor fixture structure being mounted in a machine room of the refrigerator, comprising:

a fixture plate being of a box shape with an open side and fixedly mounted on the bottom of the machine room, the fixture plate having an first opening in the center of the upper side thereof for the compressor to be inserted therein, wherein the edges of the open side are fixedly mounted on the bottom of the machine room and the upper side is opposite to the open side;

a plurality of bolts fixedly mounted around the first opening of the upper side;

a plurality of elastic members inserted over the plurality of bolts, respectively;

a plurality of compressor supports each having a second opening, one side of each of the plurality of compressor supports being fixed along the weight center line of the body of the compressor, the other side of each of the plurality of compressor supports having the second openings for the compressor supports to be inserted over the bolts over the elastic members, wherein each of the plurality of compressor supports has one second opening; and a plurality of clamping members for clamping the plurality of compressor supports while fixed to the bolts, respectively.

2. A refrigerator as claimed in claim 1, wherein the plurality of elastic members are springs.

3. A refrigerator as claimed in claim 1, wherein the plurality of elastic members are elastic rubbers.

4. A refrigerator as claimed in claim 1, wherein the plurality of elastic members are springs.

* * * * *